United States Patent
Slaby et al.

(10) Patent No.: US 9,241,064 B2
(45) Date of Patent: Jan. 19, 2016

(54) SMART METHOD AND DEVICE FOR ADAPTIVE USER INTERFACE EXPERIENCES

(75) Inventors: Jiri Slaby, Buffalo Grove, IL (US); Roger W. Ady, Chicago, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 344 days.

(21) Appl. No.: 12/789,985

(22) Filed: May 28, 2010

(65) Prior Publication Data

US 2011/0291927 A1 Dec. 1, 2011

(51) Int. Cl.
| | |
|---|---|
| *H04M 1/725* | (2006.01) |
| *B60R 11/02* | (2006.01) |
| *G06F 3/01* | (2006.01) |
| *H04M 1/04* | (2006.01) |
| *G06F 1/16* | (2006.01) |
| *H04M 1/60* | (2006.01) |

(52) U.S. Cl.
CPC ....... *H04M 1/72572* (2013.01); *B60R 11/0241* (2013.01); *G06F 1/1694* (2013.01); *G06F 3/017* (2013.01); *H04M 1/04* (2013.01); *H04M 1/72569* (2013.01); *G06F 1/1632* (2013.01); *H04M 1/6075* (2013.01); *H04M 2250/10* (2013.01); *H04M 2250/12* (2013.01)

(58) Field of Classification Search
USPC .................................................. 345/156–172
See application file for complete search history.

(56) References Cited

U.S. PATENT DOCUMENTS

| | | | |
|---|---|---|---|
| 5,280,229 A | 1/1994 | Faude et al. | |
| 5,742,149 A | 4/1998 | Simpson | |
| 6,994,575 B1 | 2/2006 | Clark et al. | |
| 7,352,567 B2 | 4/2008 | Hotelling et al. | |
| 7,480,138 B2 | 1/2009 | Kogan et al. | |
| 7,719,830 B2 | 5/2010 | Howarth et al. | |
| 2005/0071520 A1 | 3/2005 | Hull et al. | |

(Continued)

FOREIGN PATENT DOCUMENTS

| | | |
|---|---|---|
| DE | 19651781 A1 | 7/1997 |
| EP | 1613073 A1 | 1/2006 |

(Continued)

OTHER PUBLICATIONS

Motorola, "Multimedia Stations for DROID by Motorola", p. 1, http://www.motorola.com/Consumers/US-EN/Consumer-Product-and-Services/Mobile+Phone+Accessories/Chargers-and-Adapters/DROID-Multimedia-Station-US-EN.
Apple Universal Dock, 2009, pp. 1-80, www.apple.com/support.
MB881US-1S-1 Icy Dock, www.icydock.com, website: http:/www.icydock.com/product/images/mb881_kit.jpg, Jun. 12, 2009, 1page.

(Continued)

*Primary Examiner* — Kenneth B Lee, Jr.
(74) *Attorney, Agent, or Firm* — Shumaker & Sieffert, P.A.

(57) ABSTRACT

A wireless communication device (200) and method (300). The method (300) can include: detecting (310) a motion signature in a wireless communication device; sensing (320) a location of the wireless communication device; and setting (330) a user interface experience, based on the detected motion signature and sensed location of the wireless communication device. Engagement signatures can be detected in various ways, such as by dock or cradle specific connections, seating, gestures, movements in an x, y and/or z direction and location. A desired location specific user interface experience can include: a preferred user interface experience, application, display brightness, touch lens sensitivity, input key activation, and the like, based on a user preference for a particular location.

20 Claims, 11 Drawing Sheets

(56) References Cited

U.S. PATENT DOCUMENTS

| | | | |
|---|---|---|---|
| 2006/0221051 A1* | 10/2006 | Flynt et al. | 345/156 |
| 2006/0250764 A1 | 11/2006 | Howarth et al. | |
| 2007/0174490 A1 | 7/2007 | Choi et al. | |
| 2008/0140868 A1 | 6/2008 | Kalayjian et al. | |
| 2008/0280268 A1 | 11/2008 | Kelley et al. | |
| 2009/0088203 A1 | 4/2009 | Havens et al. | |
| 2009/0088204 A1 | 4/2009 | Culbert et al. | |
| 2009/0096870 A1* | 4/2009 | Zheng | 348/148 |
| 2009/0127327 A1 | 5/2009 | Rani | |
| 2009/0132197 A1* | 5/2009 | Rubin et al. | 702/141 |
| 2009/0187677 A1* | 7/2009 | Hunt et al. | 710/14 |
| 2010/0008650 A1* | 1/2010 | Bull et al. | 386/124 |
| 2010/0131691 A1 | 5/2010 | Chatterjee et al. | |
| 2010/0227493 A1 | 9/2010 | Guy et al. | |
| 2011/0162035 A1* | 6/2011 | King et al. | 726/1 |

FOREIGN PATENT DOCUMENTS

| | | |
|---|---|---|
| EP | 1708075 A2 | 10/2006 |
| GB | 2451943 A | 2/2009 |
| WO | 2006077453 A1 | 7/2006 |

OTHER PUBLICATIONS

Patent Cooperation Treaty, International Search Report and Written Opinion of the International Searching Authority for International Application No. PCT/US2011/036756, Sep. 9, 2011, 13 pages.

United States Patent and Trademark Office, "Non-Final Office Action" for U.S. Appl. No. 12/971,944 dated Jul. 19, 2012, 10 pages.

United States Patent and Trademark Office, "Notice of Allowance and Fee Due" for U.S. Appl. No. 12/609,864 dated Jul. 29, 2011, 8 pages.

United States Patent and Trademark Office, "Notice of Allowance and Fee Due" for U.S. Appl. No. 12/609,864 dated Dec. 2, 2011, 8 pages.

Office Action and English Translation from counterpart Chinese Patent Application No. 201180026069.6 dated Jun. 10, 2014, 16 pp.

Office Action from counterpart Chinese Application No. 201180026069.6, dated Sep. 18, 2014, 12 pp.

English translation of Grounds for Rejection from counterpart Korean Application No. 10-2012-7031015, dated May 16, 2014, 2 pp.

* cited by examiner

SMART METHOD AND DEVICE FOR ADAPTIVE USER INTERFACE EXPERIENCES

BACKGROUND

1. Field

The present disclosure relates to a smart method and device for adaptive user interface experiences.

2. Introduction

Users enjoy smart devices that know their location and task or application, to launch, without a user having to navigate through multiple menus.

For example, Motorola sells a cell phone called Droid, which can be used to dock with a docking station. It uses a magnet in the dock and a Hall-effect sensor in the cell phone, which launches a navigation application in vehicular use. This allows two possible locations launching two applications.

Another example is the use of identification ICs in a dock to provide identification of genuine or authentic products, and location.

There is a need for wireless communication devices, which are capable of being docked at multiple locations, which are identifiable and provide a customized user interface experience for the user, for example, by providing an alarm clock application in a bedroom, navigation for vehicular applications, email at an office and streaming video in an entertainment setting.

There is also a need to allow a user to specify a desired user interface (UI) experience or setting for a wireless communication device, to initiate at a particular docking location, and that the device learns about a user's preferences, and adapts the UI experience or setting, to the most frequently used applications.

There is also a need to provide a low cost approach to dock identification, using the existing sensors in the phone or minimal additional hardware.

There is a further need to provide personalized experiences and offer additional alternative solutions to users, which are configured with and compatible with conventional docking systems, to minimize complexity and minimize costs.

There is yet a further need to provide a smart method and device adapted to provide personalized experiences capable of being docked at multiple locations identifiable to the device, so a desired UI experience is automatically launched.

Thus, there is a need for a method and device for providing a low cost approach using conventional accelerometers, gyros, location sensors and the like, to identify a wireless communication device location, to enable a localized or customized UI experience, and that is user friendly and can use many components already found in certain wireless communication devices.

Thus, a method and device that addresses the above problems and Applicant's solutions, as detailed herein, would be considered an improvement in the art.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which:

In FIG. 8, a docking module 400 is shown unpopulated without a wireless communication device. In FIG. 9, a communication device is shown being inserted into a right portion of the docking module 400. And in FIG. 10, the wireless communication device has been snap connected to the docking module 400 with fingers 410, to hold a left side securely in the docking module 400, according to one embodiment.

In FIG. 12, the docking module 400 is shown unpopulated with a wireless communication device located above the docking module 400. In FIG. 13, the communication device is shown being lowered and making initial contact with a guide portion 415 of the docking module 400. In FIG. 14, the communication device is shown being further lowered and making contact with a connector 420, shown as a micro USB connector, of the docking module 400. And in FIG. 15, the wireless communication device is shown at rest, seated on and engaged in the docking module 400, according to one embodiment.

DETAILED DESCRIPTION

Figure 1:
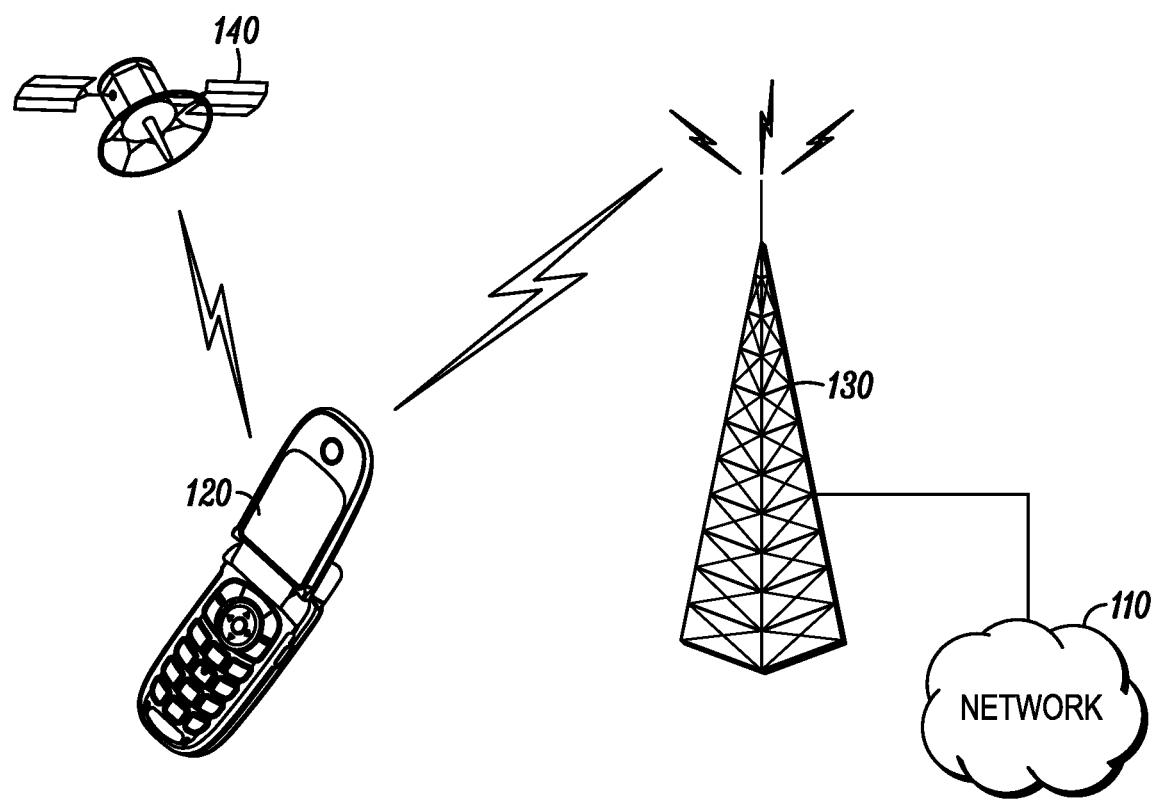
FIG. 1 is an exemplary block diagram of a communication system according to one embodiment.

FIG. 1 is an exemplary block diagram of a system 100 according to one embodiment. The system 100 can include a network 110, a terminal 120, and a base station 130. The terminal 120 may be a wireless communication device, such as a wireless telephone, a cellular telephone, a personal digital assistant, a pager, a personal computer, a selective call receiver, or any other device that is capable of sending and receiving communication signals on a network including a wireless network. The network 110 may include any type of network that is capable of sending and receiving signals, such as wireless signals. For example, the network 110 may include a wireless telecommunications network, a cellular telephone network, a Time Division Multiple Access (TDMA) network, a Code Division Multiple Access (CDMA) network, Global System for Mobile Communications (GSM), a Third Generation (3G) network, a Fourth Generation (4G) network, a satellite communications network, and other like communications systems. More generally, network 110 may include a Wide Area Network (WAN), a Local Area Network (LAN) and/or a Personal Area Network (PAN). Furthermore, the network 110 may include more than one network and may include a plurality of different types of networks. Thus, the network 110 may include a plurality of data networks, a plurality of telecommunications networks, a combination of data and telecommunications networks and other like communication systems capable of sending and receiving communication signals. In operation, the terminal 120 can communicate with the network 110 and with other devices on the network 110 by sending and receiving wireless signals via the base station 130, which may also comprise local area, and/or personal area access points. The terminal 120 is shown being in communication with a global positioning system (GPS) 140 satellite, global navigation satellite system (GNSS) or the like, for position sensing and determination.

Figure 2:
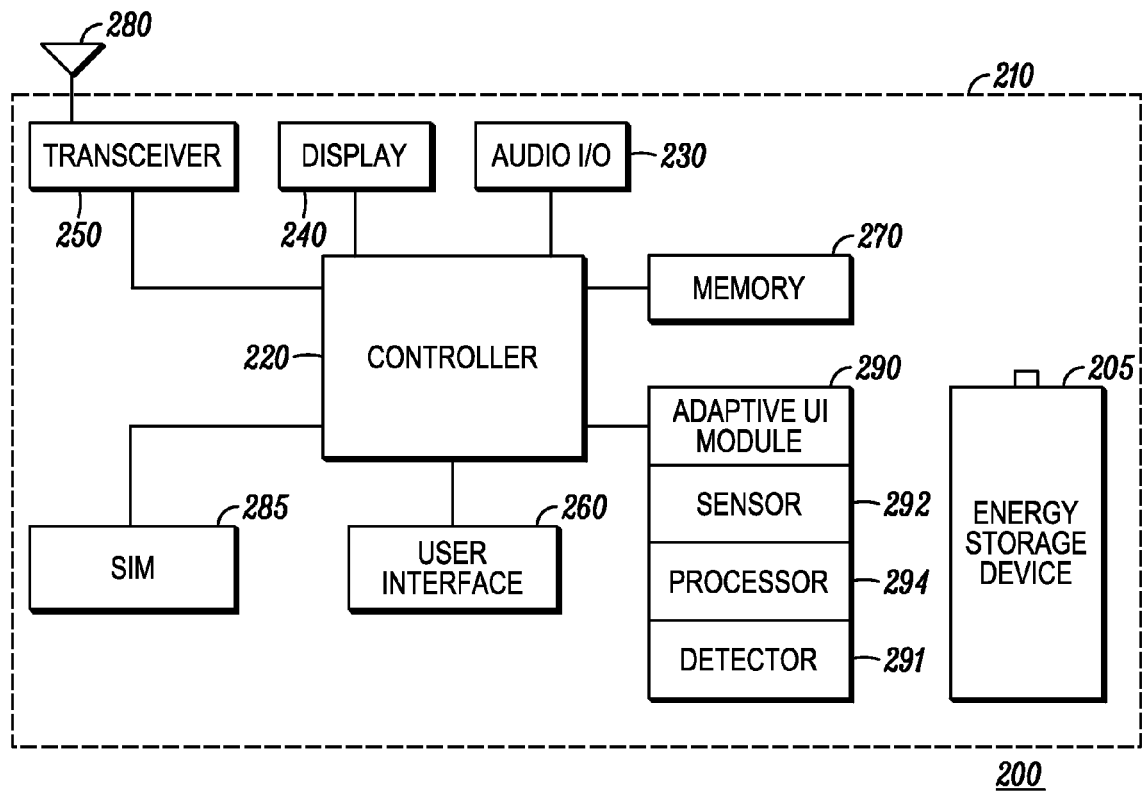
FIG. 2 is an exemplary block diagram of a wireless communication device according to one embodiment.

FIG. 2 is an exemplary block diagram of a wireless communication device 200 configured with an energy storage device or module 205, such as in the terminal 120, or in the wireless communication devices shown in FIGS. 4-7, for example. The wireless communication device 200 can include a housing 210, a controller 220 coupled to the housing 210, audio input and output circuitry 230 coupled to the housing 210, a display 240 coupled to the housing 210, a transceiver 250 coupled to the housing 210, a user interface 260 coupled to the housing 210, a memory 270 coupled to the housing 210, an antenna 280 coupled to the housing 210 and the transceiver 250, and a removable subscriber module 285 coupled to the controller 220.

As shown in FIG. 2, the wireless communication device 200 further includes an adaptive user interface module 290 configured to: detect a motion signature, and undocking signature in a wireless communication device via detector 291; sense a location of the wireless communication device via a sensor 292; and set a user interface experience, based on the detected motion signature and sensed location of the wireless communication device via a processor 294, as described in more detail below. The wireless communication device 200 is configured to be easily coupled to a docking module configured to receive a portion of the housing 210.

In one embodiment, the adaptive UI module 290 includes the detector 291 (such as an accelerometer, gyroscope, and alike—does it need to be here?), sensor 292 (such as GPS, GNSS, cellular tower, and alike—does it need to be here?) and processor module 294, coupled to the controller 220. In more detail, the module 290 can reside within the controller 220, can reside within the memory 270, can be an autonomous module, can be software, can be hardware, or can be in any other format useful for a module on a wireless communication device 200.

The display 240 can be a liquid crystal display (LCD), a light emitting diode (LED) display, a plasma display, or any other means for displaying information. The transceiver 250 may include a transmitter and/or a receiver. The audio input and output circuitry 230 can include a microphone, a speaker, a transducer, or any other audio input and output circuitry. The user interface 260 can include a keypad, buttons, a touch pad, a joystick, an additional display, or any other device useful for providing an interface between a user and an electronic device. The memory 270 may include a random access memory, a read only memory, an optical memory or any other memory that can be coupled to a wireless communication device.

In more detail, the wireless communication device 200 shown in FIG. 2, can include: a housing 210; a controller 220 coupled to the housing 210, the controller 220 configured to control the operations of the wireless communication device, and to provide ancillary computing operations which may be unrelated to wireless communications such as audio or video processing, application processing, etc.

Advantageously, the adaptive UI module 290 can automatically and dynamically manage, for example, preferred user settings for specific desired user interface experiences, as detailed herein.

Figure 3:
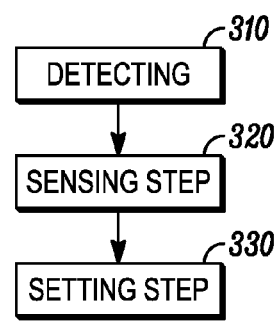
FIG. 3 is an exemplary block diagram of a engagement method according to one embodiment.

A block diagram of a wireless communication method 300, is shown in FIG. 3. In its simplest form, it can include: detecting 310 an motion signature in a wireless communication device; sensing 320 a location of the wireless communication device; and setting 330 a user interface experience, based on the detected motion signature and sensed location of the wireless communication device. A flow sequence variation of steps 310 and 320 is possible as shown in FIG. 3.

Advantageously, in one embodiment, the method 300 can use conventional or existing accelerometers, to detect a motion signature relative to a dock specific connection, seating, gesture, movement or the like in an x, y and/or z direction, or motion signature, in conjunction with location sensing with a sensor, such as a GPS or GNSS sensor, to identify a specific dock, to enable a desired location specific UI experience. The desired location specific UI experience can include: a preferred UI interface, application, display brightness, touch lens sensitivity, input key activation, and the like, based on a user preference for that particular location. The motion signature can differ between different desktop and vehicle docking modules. The detecting step 310 can include detecting a unique docking engagement signature, made by connecting or seating a wireless communication device to or on a docking station or cradle while step 320 is sensing location. In more detail, in a preferred embodiment, the detected motion signature and sensed location define an engagement signature, made by connecting a wireless communication device to a docking station at a particular location. This step allows a user, for example, to adapt his or her user interface experience, as desired, such as a slide show experience shown in FIG. 4, email application shown in FIG. 5, alarm clock experience shown in FIG. 6 and navigation application shown in FIG. 7. Advantageously, this provides an improved user experience, once the device has been programmed in a learn mode, for example, as detailed below.

As used herein, the term engagement signature means an act or condition of activating or making a wireless communication device operational in a desired way, through the use of a motion signature, such as preferably, through the use of one or more readings of an accelerometer. In one embodiment, the accelerometer provides three readings through the use of a tri-axial accelerometer having an x, y and z reading along a time scale, as illustrated for example in FIGS. 15 and 16. Alternatively, other accelerometers combination capable of sensing tri-axial motion such as 3 single axis accelerometeres, or 1 single axis with 1 dual-axis accelerometers may be used.

As should be understood by those skilled in the art, an engagement does not require a mechanical interconnection as it may simply be a seating on or with a cradle or dock, as shown in FIGS. 11-14. More particularly, a wireless communication device can simply be placed on a cradle or dock and such act of placement on a cradle or dock can provide an unique motion signature, as shown in FIG. 15. Alternatively, a snap connection motion signature is provided by the dock shown in FIGS. 8-10 and motion signature shown in FIG. 16. The second component of the engagement signature is sensing the location, preferably through GPS, GNSS (should it also state here cell tower, Wi-Fi IP address?) or the like. Thus, the combination of the motion signature and sensed location provide an engagement signature, useful to launch a desired application or user interface experience, as shown in FIGS. 4-7, for example.

In some unique cases, such as a use of single dock, the location aspect may not be required, and thus, the engagement signature would be formed by motion signature only; thus, elevating the motion signature to a level of engagement signature.

Likewise, the detecting step 310 can include detecting a unique undocking or disengagement signature made by removing a docked wireless communication device from a docking station at a particular location. Advantageously, an undocked wireless communication device can have a different or default user interface experience setting, and can be set by a user. In a home application embodiment, when a user disengages the wireless communication device, such as a phone from the dock, an accelerometer recognizes the disengagement signature and (the phone identifies lack of external power, which can trigger a power saving mode.

Figure 4:
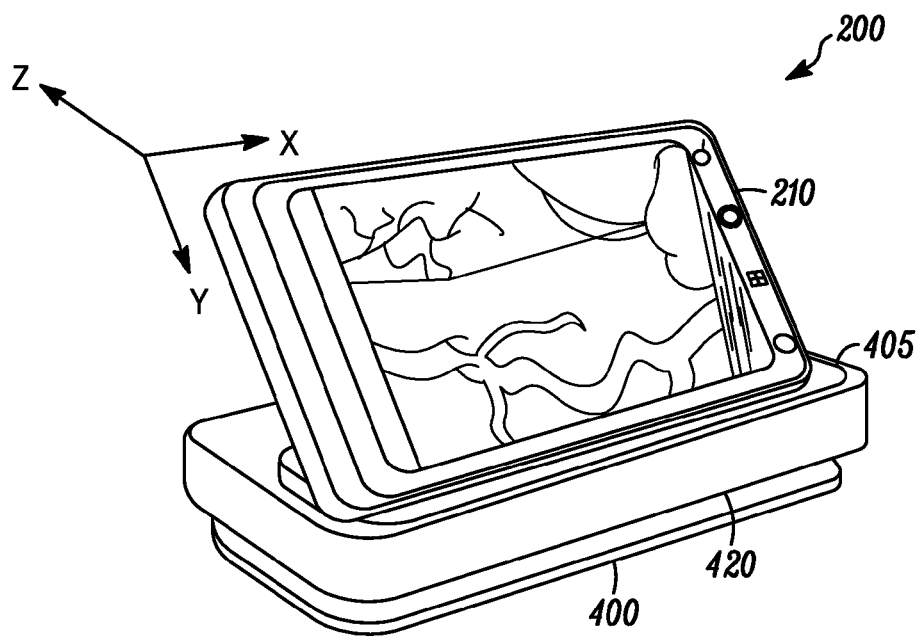
FIG. 4 is an exemplary plan view of a wireless communication device coupled with a docking module, in an entertainment room application, showing a picture slide show for example, according to one embodiment.
Figure 5:
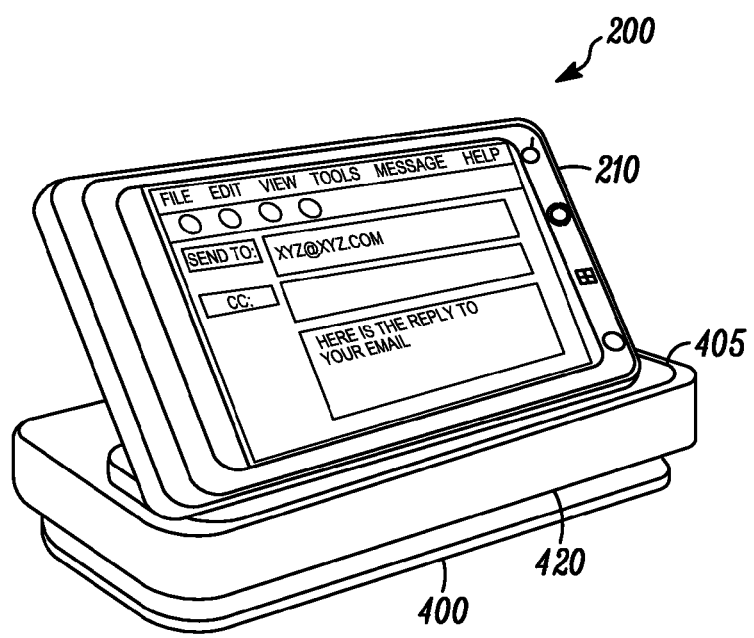
FIG. 5 is an exemplary plan view of a wireless communication device coupled with a docking module, in an office application with email for example, according to one embodiment.

As detailed herein, engagement signatures can be provided by various ways as a unique engagement signature can be formed by engaging a wireless communication device with a docking module at a particular location. The motion signatures can be factory set, downloaded, learned in a learn mode programmed by a user, and the like. For a user, they can also enhance over multiple dockings in a learn mode. The default motion signature setting would be provided by the manufacturer as a factory setting for the manufacturer's docking system. In addition, the wireless communication device can rest at a certain tilt, in certain docking modules, such as shown in FIGS. 4 and 5. The tilt can be part of the motion signature. Another component of the motion signature is how it engages and contacts the dock module 400. In any event, an accelerometer can be used to detect the motion signature to define in combination with location sensing the engagement signature.

Figure 6:
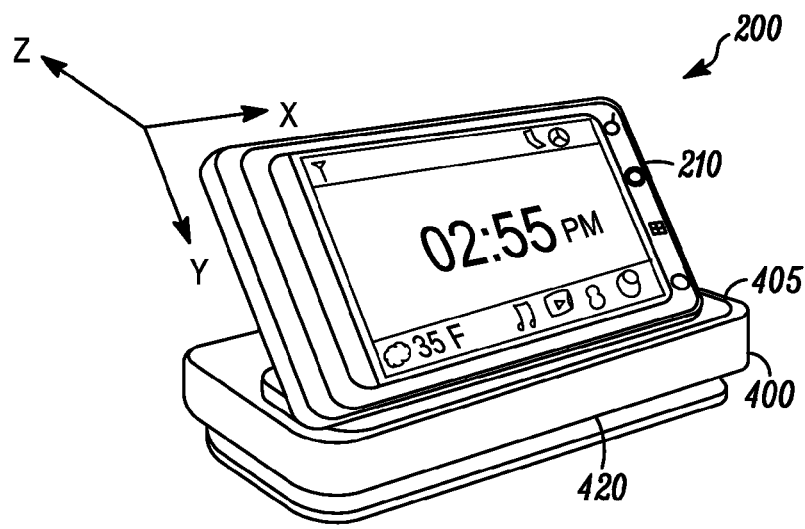
FIG. 6 is an exemplary plan view of a wireless communication device coupled with a docking module, running an alarm clock application in a home, according to one embodiment.

As shown in FIG. 6 a wireless communication device, such as a smart phone such as a Motorola Droid or Milestone can be slid into a dock, eventually resting on the dock, and this unique engagement signature can be detected by an accelerometer.

In addition, in another embodiment the dock presence may be cross-verified by presence of uUSB power connector 420, as shown in FIGS. 4 and 5.

The setting step 330 can include at least one of: configuring the user interface experience for use at home; configuring the user interface experience for use at work; and configuring the user interface experience for use in a vehicle, as detailed with respect to FIGS. 4-7.

The setting step 330 can include providing a customizable user interface experience setting. Advantageously, an adaptive UI experience can be set by user. Further, a user's preferences and most frequently used applications and/or settings can be stored, and the method 300 can adaptively tune the settings, and suggests the most often used applications, providing a smart method and device which is particularly useful to a user's work and personal desires.

Advantageously, a user can have a default setting for a docked user interface experience and a desired experience when docked at each different docking station, depending on the location and motion signature; thus, engagement signature, as detailed herein. In a preferred embodiment, the setting step 330 includes launching a desired application, such as alarm clock application, Gmail or Microsoft Outlook at work or at a home office, and a navigation application for vehicular use.

In one embodiment, the detecting step 310 includes providing at least one of an accelerometer and a gyroscope for enhanced motion signature reading and mapping. Combination of an accelerometer and a gyroscope can provide an enhanced motion signature, as the gyroscope can provide rotational, or orientation, readings, which can be useful in distinguishing between physically similar docks. As should be understood, other detectors and sensors to recognize devices in close proximity to certain locations, such as dock modules, can include BlueTooth (BT), Wi-Fi networks, proximity sensors, and the like. The detection of the presence of the BT, Wi-Fi, or other communication methods can allow the phone to automatically become part of the network to share data, stream music and video, and gaming, while the IP addresses and other device identifiers provide secondary confirmation to the phone that it is at the given location. In addition, indoor navigation using gyro mapping and tracking, in addition to other sensors, can be used to recognize locations in close proximity such as neighboring rooms or offices.

In one embodiment, the sensing step 320 includes providing location information by at least one of a GPS or GNSS receiver. In another embodiment, cell tower signal can be used for location approximation. In yet another embodiment, Wi-Fi network IP addresses can be used for the location identification, as should be understood by those skilled in the art.

In one embodiment, the method 300 includes providing a learning mode including learning and storing the engagement signature and location in memory. The learning mode would be used to enhance particular users engagement style based on the data aggregation and evaluation by the device over multiple engagements.

In one embodiment, the method 300 can further include providing memory including a look-up table including data relating to engagement signatures comprised of motion signature and location. As should be understood, different docks will have different engagement signatures based on the physical features of the dock, angle, and location. The look-up table serves as a storage of this data. Thus the device refers to the look-up table to determine the UI to display based on the identified dock location.

In its simplest form in FIGS. 2, 4-7, a wireless communication device 200, is shown, comprising: a housing 210; a controller 220 coupled to the housing 210, the controller 220 configured to control the operations of a wireless communication device; an adaptive user interface module 290 configured to: detect a motion signature in a wireless communication device; sense a location of the wireless communication device; and set a user interface experience, based on the detected motion signature and sensed location of the wireless communication device; and a docking module 400 configured to receive a portion 405 of the housing 210.

Figure 7:
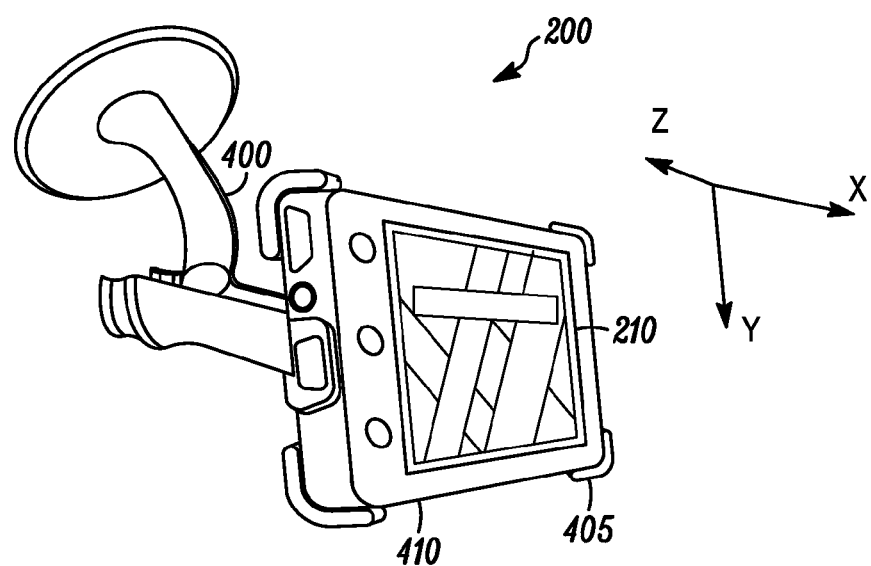
FIG. 7 is an exemplary plan view of a wireless communication device coupled with a docking module, running a vehicular navigation application, according to one embodiment.

Advantageously, this structure provides a smart method and device adapted to provide multiple, personalized experiences capable of being docked at multiple locations identifiable to the device, so a desired UI experience is automatically launched, such as streaming video in FIG. 4, email in FIG. 5, alarm clock in FIG. 6 and navigation in FIG. 7.

Advantageously, based on motion signature and dock location, the combination defining an engagement signature, the wireless communication device can trigger or launch a desired specific UI experience or application, that is preferred or most often used at a particular location.

In a preferred embodiment, the wireless communication device senses its location by use of a GPS or GNSS receiver or sensor. The GPS or GNSS sensor tracks its location, and it knows when it is leaving an existing dock location and approaching a new dock location.

In a preferred embodiment, the wireless communication device detects engagement signatures by utilizing an accelerometer, based on its characteristic coupling, seating, snap/engagement, x, y and/or z movement or signature when the wireless communication device is docked or coupled, the accelerometer advises whether the wireless communication device has been connected to a dock, as well as when it is disconnected. As an example, the engagement signature can be formed by a wireless communication device angle or tilt, motion or mechanical engagement, as shown for example in FIGS. 4-7, and a location sensing. As previously detailed, the engagement signature can produce an act or condition of activating or making a wireless communication device operational in a desired way, through the use of a motion signature, preferably by use of a tri-axial accelerometer having an x, y and z reading along a time scale, as illustrated for example in FIGS. 15 and 16. As should be understood by those skilled in the art, an engagement does not require a mechanical interconnection as it may simply be a seating on or with a cradle or dock as shown in FIGS. 4, 5 and 11-14. More particularly, a wireless communication device can simply be placed on a cradle or dock and such act of placement on a cradle or dock can provide an unique motion signature, as shown. The second component of the engagement signature in sensing the location, preferably through GPS or GNSS. Thus the motion signature and sensed location provide an engagement signature, useful to launch a desired application or user interface experience.

In a preferred embodiment, the adaptive user interface module 290 includes at least one detector, such as a tri-axial accelerometer, configured to detect a first unique docking engagement signature, made by seating or connecting the wireless communication device 200 on or to a docking module 405 and detecting a second unique undocking or disengagement signature made by removing the seated or docked wireless communication device from the docking module. As previously detailed, advantageously a preferred first and second application can be launched, based on the first engagement and second unique undocking or disengagement signatures, respectively The adaptive user interface module includes at least one of: configuring the user interface experience for use at home; configuring the user interface experience for use at work; configuring the user interface experience for use in a vehicle; and configuring the user interface experience for personal use, by for example connection to a holster, pouch, belt or arm strap for exercising, hiking and the like. Thus a user could set a desired audio or navigation application set for exercise or hiking.

In a preferred embodiment, the wireless communication device is smart and adaptive. For example, the UI learns and adapts based on a user's application use style. The wireless communication device gathers information about most frequently used applications based on at least the motion signature and location comprising the engagement signature. In use, once the wireless communication device is docked, and phone identifies the particular code, such as the motion signature and location, a certain desired application is displayed.

In addition to application and various other settings that can be adjusted at particular locations, additional devices may be used for the following purposes: A) Automatic connection: Upon location identification, the device is automatically connected to the phone via preferred wireless means. B) Location cross-verification: The device is used to provide additional confirmation of location. The phone is aware that at particular location, it is supposed to find additional devices to communicate with, such as Bluetooth in a vehicle.

FIG. 4 is an exemplary plan view of a wireless communication device in the form of a smart phone known as a Motorola Droid (I suggest to change the FIGS. 4&5 to Droid, PPT file is attached, to make all figures consistent), coupled with a docking module, in an entertainment room application, showing a slide show.

FIG. 5 is an exemplary plan view of a wireless communication device in the form of a smart phone known as a Motorola Droid (I suggest to change the FIGS. 4&5 to Droid, PPT file is attached, to make all figures consistent) seated on a docking module, in an office application with email.

FIG. 6 is an exemplary plan view of a wireless communication device in the form of a smart phone known as a Motorola Droid or Milestone, coupled with and seated on a docking module, running an alarm clock application in a home or at a hotel.

FIG. 7 is an exemplary perspective view of a wireless communication device, in the form of a smart phone known as a Motorola Droid or Milestone, coupled with a docking module, running a vehicular navigation application. In use, a user travels to a vehicle and connects the wireless communication device with a dock. In a preferred embodiment, an accelerometer recognizes the motion signature, which can be a cradle seating or snap engagement. This is also an example of a case where the engagement signature equals the motion signature, as the cradle motion signature differs from the desktop dock; thus, location information may not be needed. External power can be provided, but does not adversely affect the engagement signature.

In another embodiment however, the vehicular dock in FIG. 7, may be substantially identical to a personal dock, on a user's belt or arm band, and location sensing would be important in such case, to launch the desired user interface experience, such as navigation for vehicular use and music for exercise, for example.

In another preferred user case, when the wireless communication device is removed from the vehicular dock in FIG. 7, this can be recognized by an accelerometer via an undocking or disengagement signature. In this case, a GPS or GNSS sensor can identify a new or different location, such as a home or office location, such as shown in FIG. 4 and FIG. 5, respectively. Once the accelerometer identifies the desktop dock motion signature and location is sensed, the preferred UI experience appears on the display.

Figure 8:
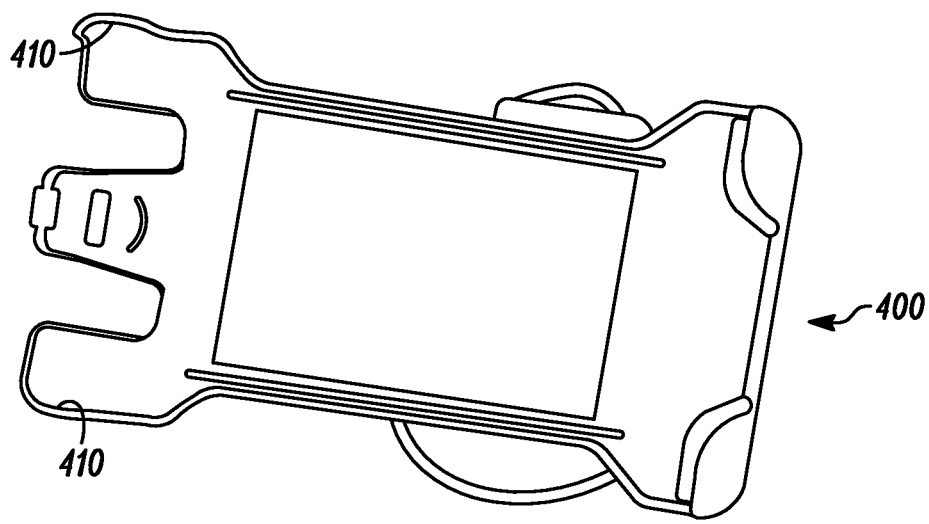
FIGS. 8-10 illustrate exemplary steps for docking a wireless communication device to a docking module 400, in a personal or vehicular application.
Figure 9:
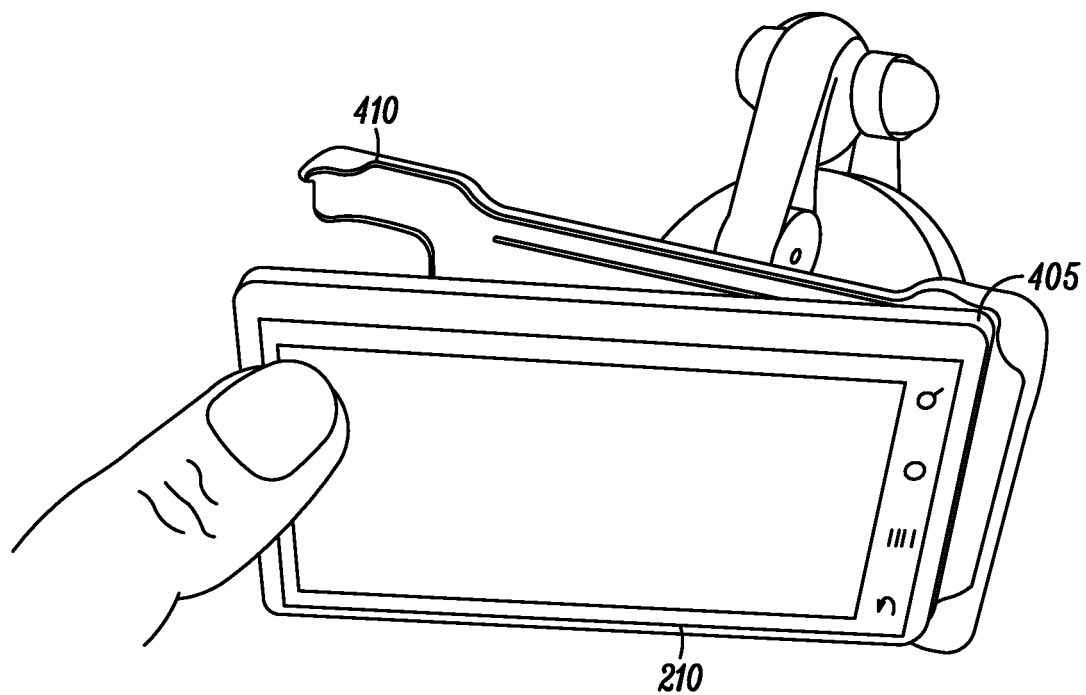
Figure 10:
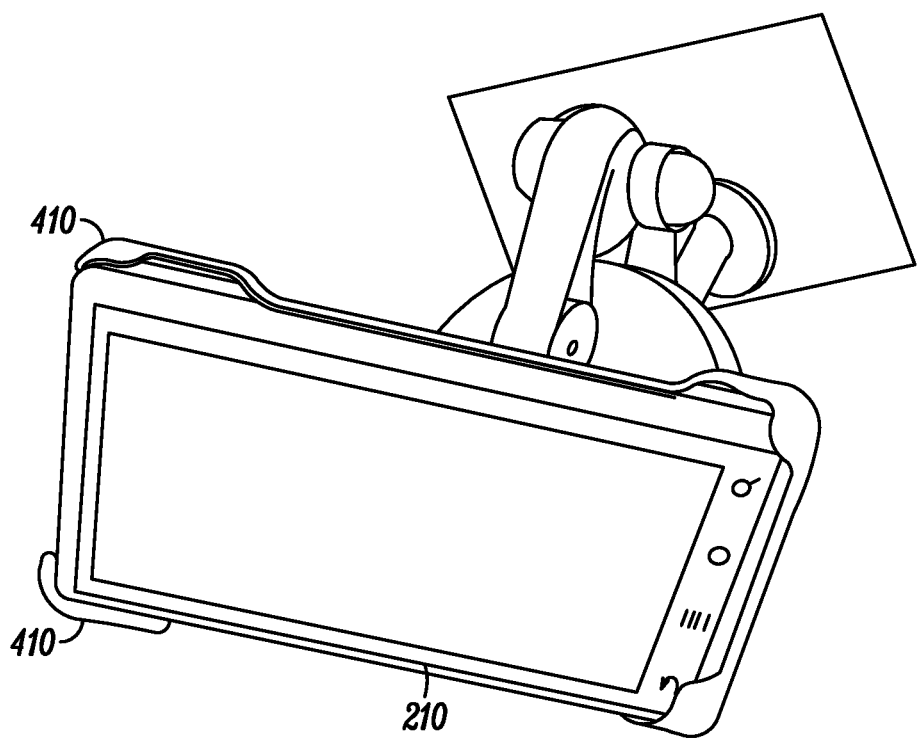

FIGS. 8-10 illustrate exemplary steps for docking a wireless communication device to a docking module 400, in a personal or vehicular application. In FIG. 8, a docking module 400 is shown unpopulated without a wireless communication device. In FIG. 9, a communication device is shown being inserted into a right portion of the docking module 400. And in FIG. 10, the wireless communication device has been snap connected to the docking module 400 with fingers 410, to hold a left side securely in the docking module 400, according to one embodiment.

Figure 11:
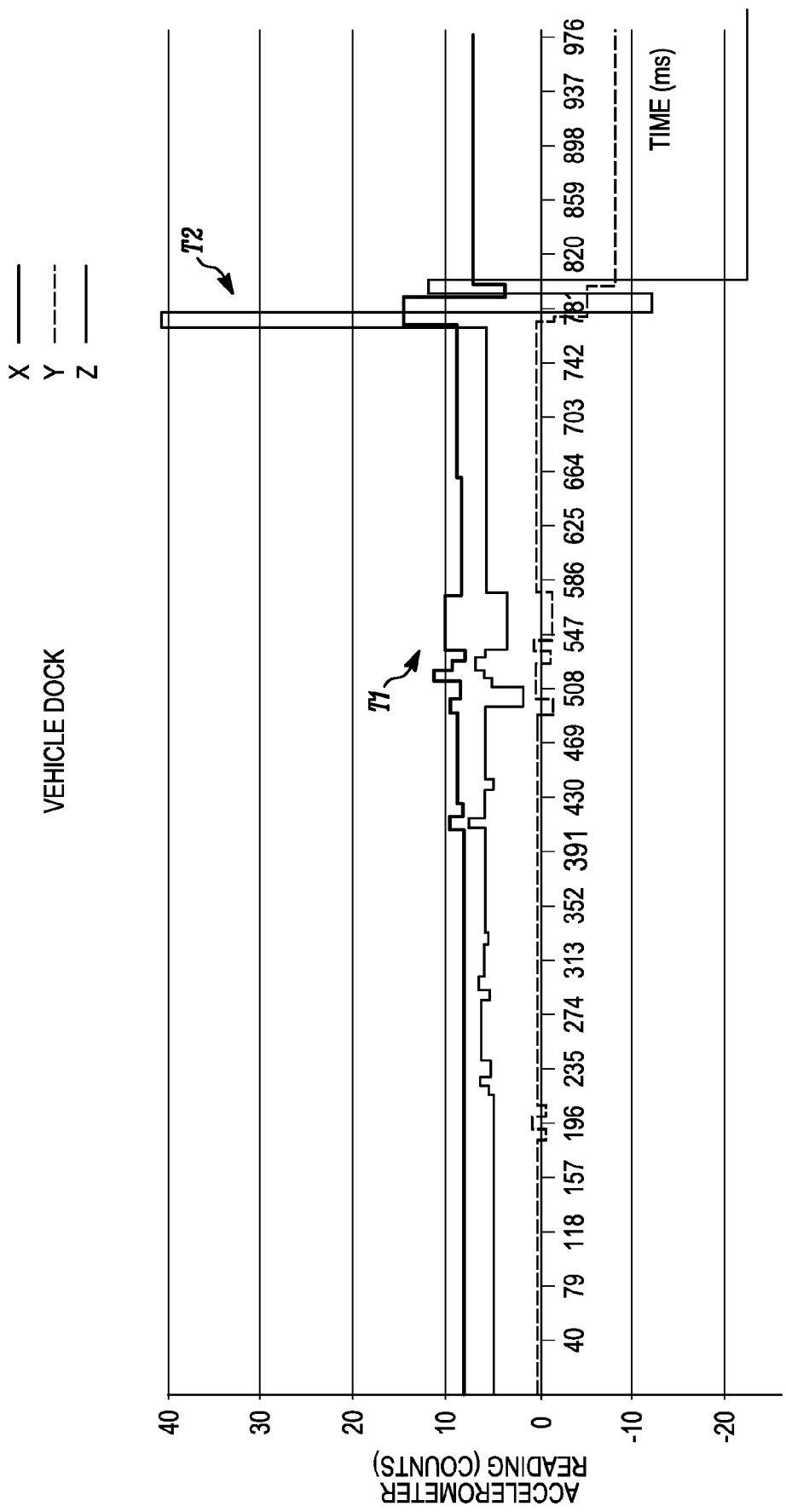
FIG. 11 is a graph illustrating a motion signature for docking a wireless communication device with a docking module, as shown in FIGS. 8-10. The vertical axis is in counts and the horizontal is time. T1 corresponds to initial contact with x, y and z readings of an accelerometer, as shown in FIG. 9 and T2 corresponds to snap connection with x, y and z readings, as shown in FIG. 10.

FIG. 11 is a graph illustrating a motion signature for docking a wireless communication device with a docking module, as shown in FIGS. 8-10. The vertical axis is in counts that may be converted to $m/s^2$ and the horizontal is time. T1 corresponds to initial contact with x, y and z readings of an accelerator, as shown in FIG. 9 and T2 corresponds to snap connection with x, y and z readings, as shown in FIG. 10.

Figure 12:
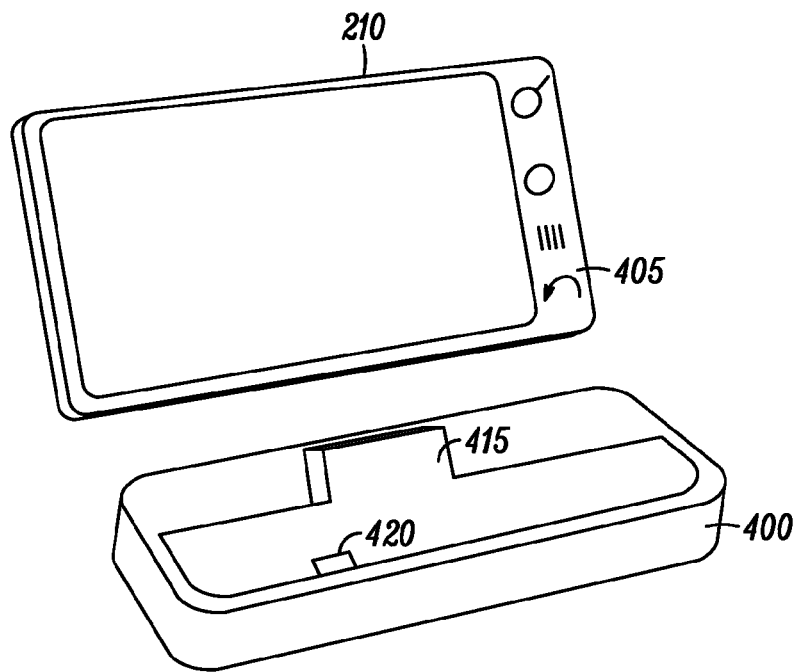
FIGS. 12-15 illustrate exemplary steps for seating a wireless communication device with a docking module 400, shown in the form of a cradle adapted for desktop docking.
Figure 13:
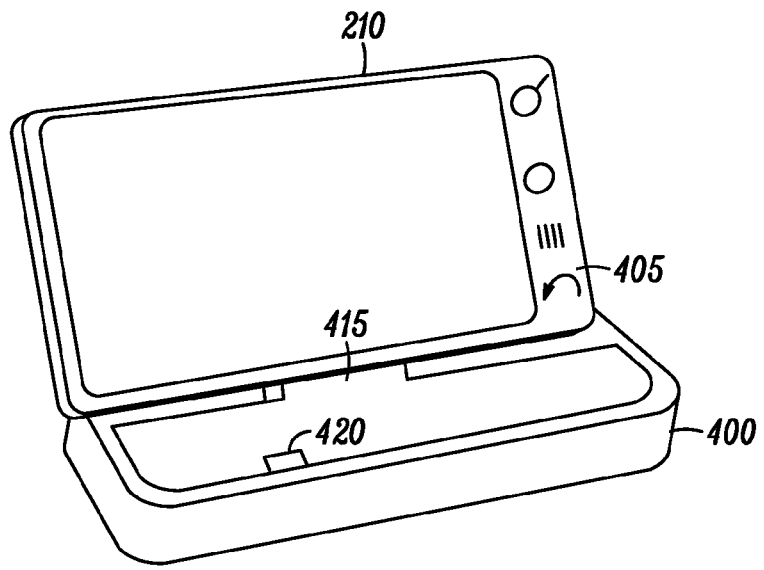
Figure 14:
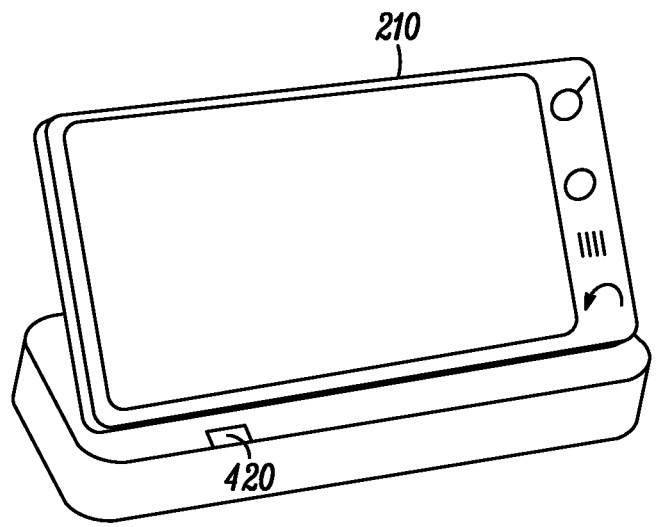
Figure 15:
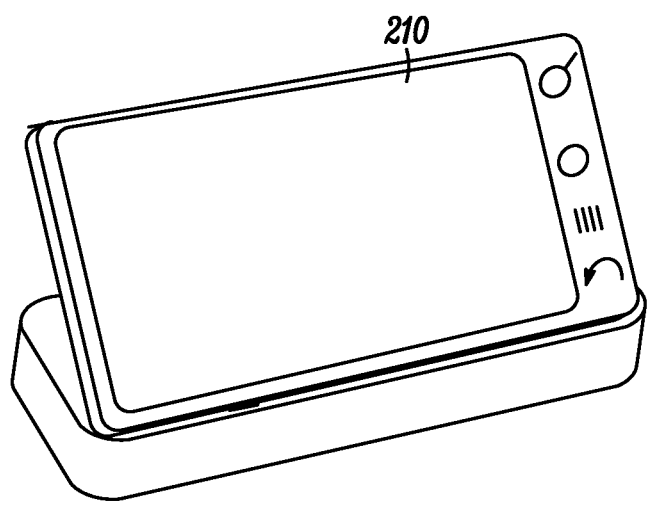

FIGS. 12-15 illustrate exemplary steps for seating a wireless communication device with a docking module 400, shown in the form of a cradle adapted for desktop docking. In FIG. 12, the docking module 400 is shown unpopulated with a wireless communication device located above the docking module 400. In FIG. 13, the communication device is shown being lowered and making initial contact with a guide portion 415 of the docking module 400. In FIG. 14, the communication device is shown being further lowered and making contact with a connector 420, shown as a micro USB connector, of the docking module 400. And in FIG. 15, the wireless communication device is shown at rest, seated on and engaged in the docking module 400, according to one embodiment.

Figure 16:
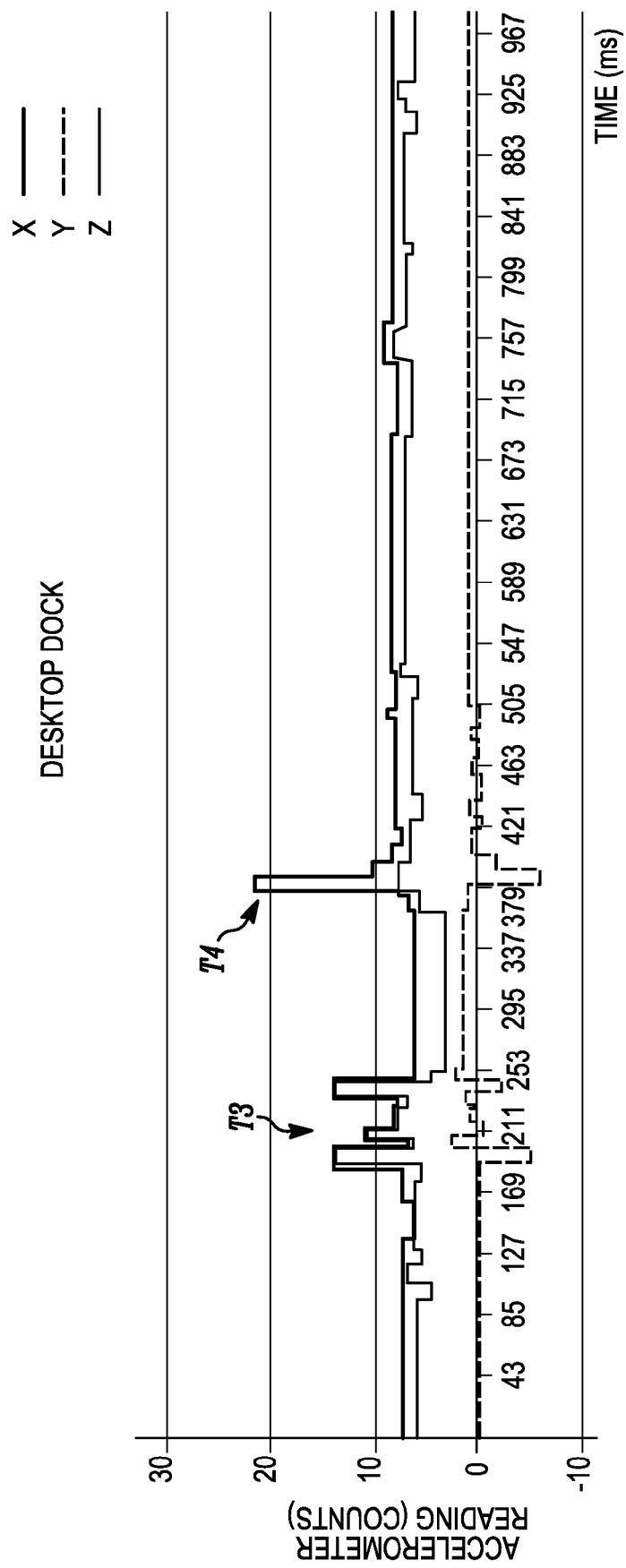
FIG. 16 is a graph illustrating a motion signature for docking a wireless communication device with a docking module, as shown in FIGS. 12-15. The vertical axis is in counts and the horizontal axis is time. T3 corresponds to initial contact with x, y and z readings of an accelerator, as shown in FIGS. 13 and 14 and T2 corresponds to completed engagement with x, y and z readings, as shown in FIG. 15.

FIG. 16 is a graph illustrating a motion signature for docking a wireless communication device with a docking module, as shown in FIGS. 12-15. The vertical axis is in counts that may be converted to $m/s^2$ and the horizontal axis is time. T3 corresponds to initial contact with x, y and z readings of an accelerator, as shown in FIGS. 13 and 14 and T2 corresponds to completed engagement with x, y and z readings, as shown in FIG. 15.

Figure 17:
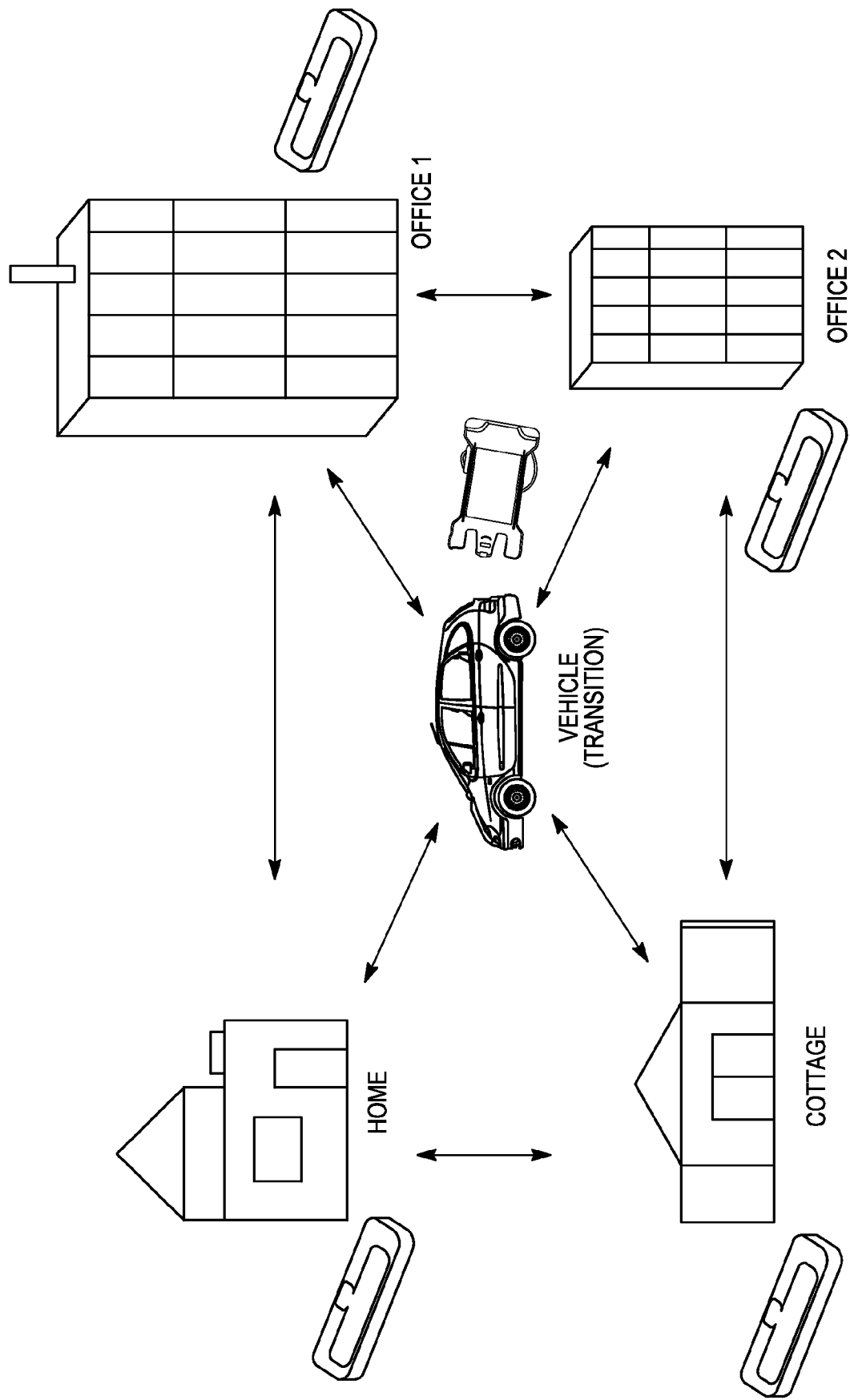
FIG. 17 is an environmental view illustrating various use cases. For example, at home a user may desire a first user interface experience, such as Gmail, on vacation a user may desire a weather application, in vehicle a user may desire a navigation program to be launched, during personal times, a user may desire a default exercise program or music application, and at a first office and at a second office a user may desire outlook to be a default launched program.

FIG. 17 is an environmental view illustrating various use cases. For example, at home a user may desire a first user interface experience, such as Gmail, on vacation a user may desire a weather application, in vehicle a user may desire a navigation program to be launched, during personal times, a user may desire a default exercise program or music application, and at a first office and at a second office a user may desire outlook to be a default launched program.

The device 200 and method 300 are preferably implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A wireless communication method, comprising:
    detecting, by a wireless communication device, a motion signature of the wireless communication device made by connecting or seating the wireless communication device in a docking station, wherein the motion signature defines movement of the wireless communication device in at least one direction during the connecting or the seating of the wireless communication device in the docking station;
    sensing, by the wireless communication device, a location of the docking station during the connecting or the seating of the wireless communication device in the docking station;
    defining, by the wireless communication device, based on the motion signature and the location of the docking station, an engagement signature; and
    setting, by the wireless communication device, based on the engagement signature, a user interface experience of the wireless communication device.

2. The wireless communication method of claim 1, wherein detecting the motion signature of the wireless communication device includes detecting, by the wireless communication device, a unique undocking signature made by removing a docked wireless communication device from a docking station.

3. The wireless communication method of claim 1, wherein setting the user interface experience of the wireless communication device comprises at least one of:
    configuring, by the wireless communication device, the user interface experience of the wireless communication device for use at home;
    configuring, by the wireless communication device, the user interface experience of the wireless communication device for use at work; or
    configuring, by the wireless communication device, the user interface experience of the wireless communication device for use in a vehicle.

4. The wireless communication method of claim 1, wherein setting the user interface experience of the wireless communication device comprises providing a customizable user interface experience.

5. The wireless communication method of claim 1, wherein setting the user interface experience of the wireless communication device comprises launching a predetermined application.

6. The wireless communication method of claim 1, wherein detecting the motion signature of the wireless communication device comprises detecting the motion signature of the wireless communication device using at least one of an accelerometer and a gyroscope.

7. The wireless communication method of claim 1, wherein sensing the location of the docking station during the connecting or the seating of the wireless communication device in the docking station comprises sensing the location using at least one of a GPS receiver or a global navigation satellite system receiver.

8. The wireless communication method of claim 1, further comprising:
   learning, by the wireless communication device, the motion signature of the wireless communication device made by the connecting or the seating the wireless communication device in the docking station and the location of the docking station during the connecting or the seating of the wireless communication device in the docking station; and
   storing, by the wireless communication device, the learned motion signature and location.

9. The wireless communication method of claim 1, further comprising:
   storing, in a memory of the wireless communication device, a look-up table including data relating to motion signatures and location; and
   wherein setting, based on the engagement signature, the user interface experience of the wireless communication device comprises comparing, by the wireless communication device, the engagement signature to the data in the look-up table.

10. A system comprising:
   a docking station; and
   a wireless communication device comprising:
     a housing;
     a controller configured to control the operations of the wireless communication device; and
     an adaptive user interface module configured to:
       detect a motion signature of the wireless communication device made by connecting or seating the wireless communication device in the docking station, wherein the motion signature defines movement of the wireless communication device in at least one direction during the connecting or the seating of the wireless communication device in the docking station;
       sense a location of the docking station during the connecting or the seating of the wireless communication device in the docking station;
       define, based on the motion signature and the location of the docking station, an engagement signature; and
       set, based on the engagement signature, a user interface experience of the wireless communication device.

11. The wireless communication device of claim 10, wherein the adaptive user interface module comprises at least one detector configured to detect a first unique docking engagement signature, made by the connecting or the seating the wireless communication device to the docking station, and a second unique undocking signature made by removing the docked wireless communication device from the docking station.

12. The wireless communication device of claim 1, wherein the adaptive user interface module is configured to set the user interface experience of the wireless communication device by at least one of:
   configuring the user interface experience for use at home;
   configuring the user interface experience for use at work;
   configuring the user interface experience for use in a vehicle; or
   configuring the user interface experience for personal use.

13. The wireless communication device of claim 10, wherein the adaptive user interface module is configured to set the user interface experience by providing a customizable user interface experience.

14. The wireless communication device of claim 10, wherein the adaptive user interface module is configured to set the user interface experience by at least launching a predetermined application.

15. The wireless communication device of claim 10, wherein the adaptive user interface module includes at least one of an accelerometer and a gyroscope.

16. The wireless communication device of claim 10, wherein the adaptive user interface module includes at least one of a GPS receiver and a global navigation satellite system receiver.

17. The wireless communication device of claim 10, wherein the adaptive user interface module is configured to:
   learn the motion signature of the wireless communication device made by the connecting or the seating the wireless communication device in the docking station and the location of the docking station during the connecting or the seating of the wireless communication device in the docking station; and
   store the learned motion signature and location.

18. The wireless communication device of claim 10, further comprising memory storing a look-up table including data relating to a plurality of engagement signatures, wherein the adaptive user interface module is configured to set the user interface experience of the wireless communication device by at least comparing the engagement signature to the data in the look-up table.

19. A wireless communication method, comprising:
   detecting, by a wireless communication device, a motion signature of the wireless communication device made by connecting or seating the wireless communication device in a docking station at a particular location, wherein the motion signature defines movement of the wireless communication device in at least one direction during the connecting or the seating of the wireless communication device in the docking station;
   sensing, by the wireless communication device, the particular location of the docking station;
   defining, by the wireless communication device, based on the detected motion signature and the particular location of the docking station, an engagement signature; and
   setting, by the wireless communication device, based on the engagement signature, a user interface experience of the wireless communication device, for use at home or for use at work.

20. The wireless communication method of claim 1, wherein the docking station comprises one of a desktop docking station or a vehicle docking station, and wherein the motion signature associated with the desktop docking station is different than the motion signature associated with the vehicle docking station.

* * * * *